A. D. CILLARD.
UNIVERSAL TESTING DEVICE FOR FABRICS, RUBBER, METAL, &c.
APPLICATION FILED SEPT. 5, 1907.
969,089.
Patented Aug. 30, 1910.
3 SHEETS—SHEET 1.
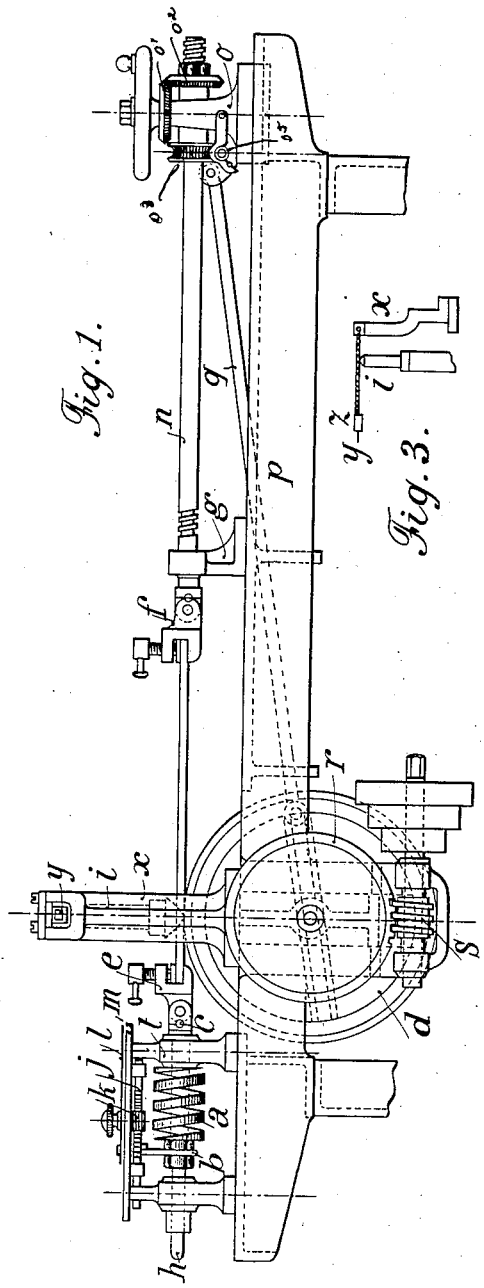
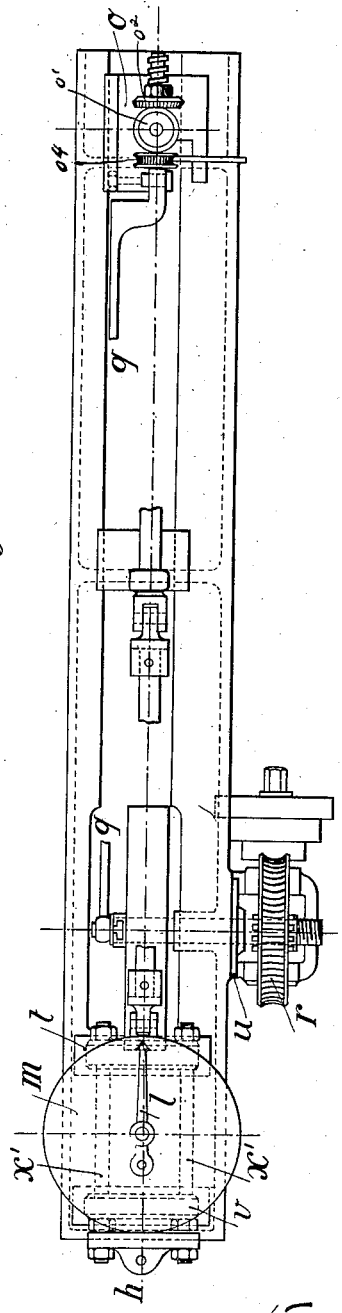

A. D. CILLARD.
UNIVERSAL TESTING DEVICE FOR FABRICS, RUBBER, METAL, &c.
APPLICATION FILED SEPT. 5, 1907.
969,089.
Patented Aug. 30, 1910.
3 SHEETS—SHEET 2.
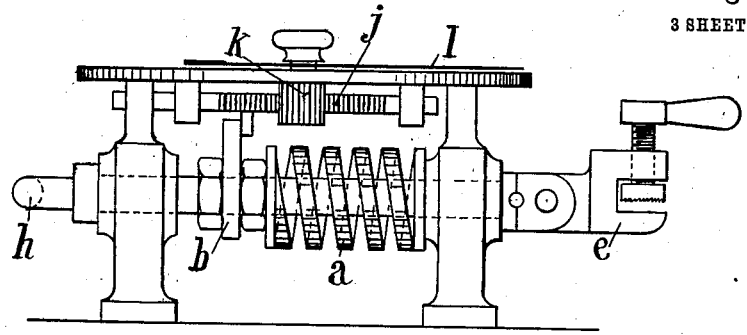
Fig. 4.
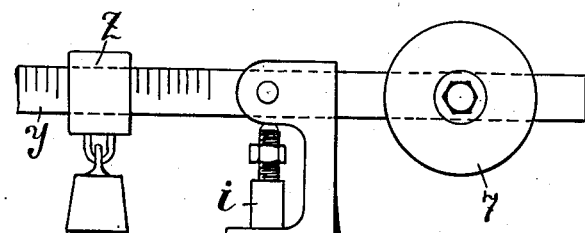
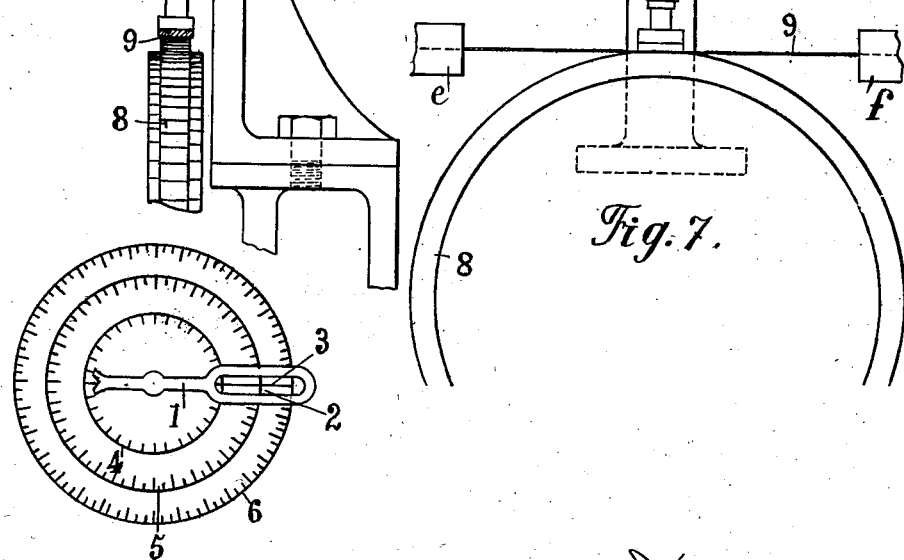

A. D. CILLARD.
UNIVERSAL TESTING DEVICE FOR FABRICS, RUBBER, METAL, &c.
APPLICATION FILED SEPT. 5, 1907.
969,089.
Patented Aug. 30, 1910.
3 SHEETS—SHEET 3.
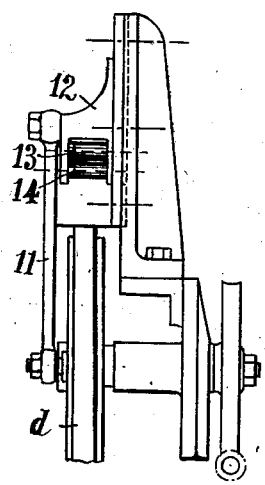
Fig. 8.
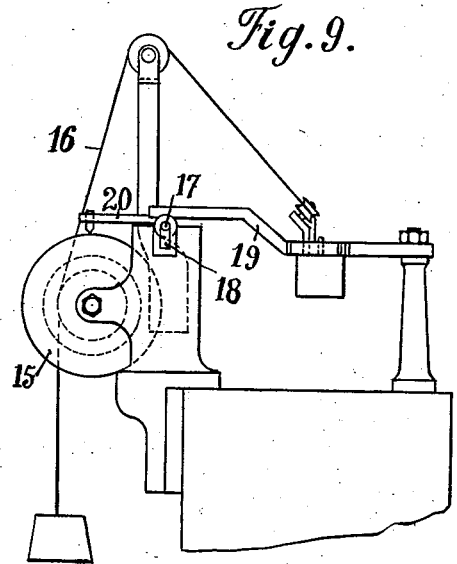
Fig. 9.
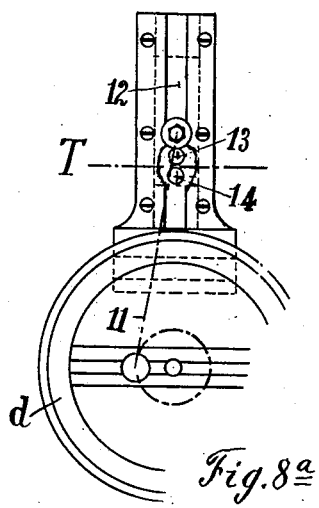
Fig. 8ª.
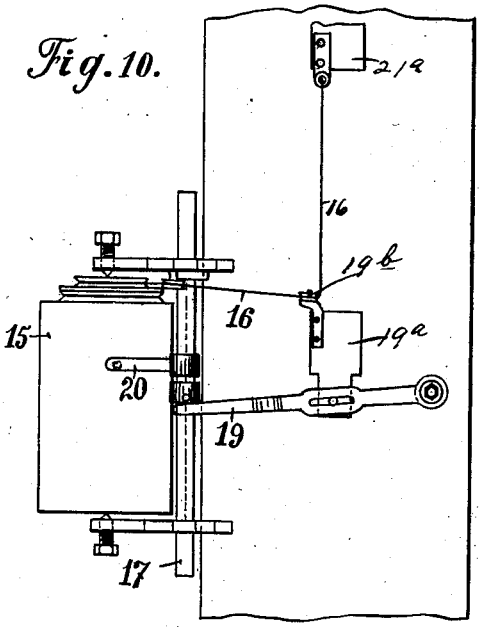
Fig. 10.

UNITED STATES PATENT OFFICE.

ALFRED DÉSIRÉ CILLARD, OF PARIS, FRANCE.

UNIVERSAL TESTING DEVICE FOR FABRICS, RUBBER, METAL, &c.

969,089.

Specification of Letters Patent. Patented Aug. 30, 1910.

Application filed September 5, 1907. Serial No. 391,534.

*To all whom it may concern:*

Be it known that I, ALFRED DÉSIRÉ CIL-LARD, a citizen of the Republic of France, residing at Paris, France, have invented certain new and useful Improvements in Universal Testing Devices for Fabrics, Rubber, Metal, &c., of which the following is a full, clear, and exact specification.

This invention relates to improvements in universal testing devices for fabrics, rubber, metal and so forth and has for its object to provide a dynamometer which combines the necessary arrangements for experimental tests of fabrics, caoutchoucs, papers, leathers, belts or straps, thin sheets of metal, wires, threads and the like in the various forms under which they can be met with and tested. It permits of testing samples taken from the pieces or these pieces themselves by various methods such as static-traction or tension, repeated tractions, static or repeated compression or bending, such trials being made at the ordinary temperature or at a temperature above or below the atmospheric temperature. The testing device permits also of determining the durability or wear of the pieces to be examined, their coefficient of friction, their heating while in use, the plasticity of certain bodies and like particulars. It also permits of determining the resistance of tissues or fabrics or other pieces to perforation in known conditions of tension.

The dynamometer is composed of a metallic body or framework solid and stable in the lower frame in which all the parts can be arranged which are required to be fitted for the various kinds of tests and measurements made with this device. This body carries on its upper part a table which receives the entire testing system.

In the accompanying drawings illustrating the testing device, Figure 1 is an elevation, Fig. 2 is a plan view and Fig. 3 a detail view of parts of the apparatus. Figs. 4–10 are detail views, Fig. 4 showing at a larger scale the measuring spring and the adjacent parts as at the left end of Fig. 1. Fig. 5 is a plan view of the dial plate. Figs. 6 and 7 show in side and end elevation the device for testing a strip of material by abrasion while being under a known pressure and tension. Fig. 8 shows in side elevation and Fig. 8ª in front elevation the device for bending or flexing continuously the strip to be tested. Fig. 9 is a side view, and Fig. 10 a plan view of the registering device.

Referring to the drawings, the dynamometer comprises a measuring apparatus consisting of a spiral spring $a$ one part of which is supported against a cross-piece $t$ forming one piece with the frame $p$ and the other part being arranged to press upon this cross-piece by means of a rod guided in the cross-piece the rod carrying one of the jaws $e$ for holding the pieces to be tested. Two rods $x'$ pass loosely through the first cross-piece and are connected to a second cross-piece $v$ which is provided with a connecting or coupling arrangement $h$. Fig. 4 shows this device at an enlarged scale. All the cross-pieces and the spiral spring can be detached from the dynamometer and by suspending it by the eye-bolt $h$ and hanging weights to the jaw $e$ the resisting power of the spring can be noted in operation from the weights which are hung from it, that is to say the tare of the measuring apparatus can be ascertained whenever desired. The deformations of the spring are further amplified and read in the following manner: The rod is provided with a swinging or guiding finger $b$ clamped between two nuts or fixed in any other convenient manner. This finger carries with it a toothed rack $j$ which is guided and which engages with a pinion $k$, see Fig. 4, on the vertical axis of which is fixed a needle $l$ moving over a dial $m$ with suitable graduation, the needle can thus remain stationary at the moment of the rupture or breakage of the pieces undergoing the test. This device for measuring strains is especially useful as it is at any time removable for tarage.

The device for measuring the power exerted, comprises a spiral spring under pressure, the deformation of which serves to measure the power. For the purpose of measuring these deformations the guide finger $b$ upon the shaft carrying the spring $a$ is worked against the toothed rack $j$ as described and shown in Fig. 4.

An apparatus is graduated (or its graduation is verified, a process that is called taring), in suspending the frame with the registering means from the bolt loop $h$ Figs. 1, 2 and 4 and in hanging the weights in the jaw $e$. It will be understood that the needle $l$ only turns in one direction and remains in its most advanced position without returning by itself to the starting point, provided the finger b is made to only operate in one direction, and this finger at the end of its operation goes back as soon as the spring expands again, without retracting either the rack or the pinion.

It may here be stated that the springs may easily be exchanged and consequently the sensibility of the instrument may be changed without disturbing other parts, it is sufficient that the springs have the same length and outer diameter. So for instance springs may be used which with a load of 50 kg. move the needle over the entire dial, others with loads of 100 and 500 kg., etc. In this case for each spring a special graduated scale must be used which are arranged concentrically as shown in Fig. 5 and only one needle or hand is necessary to move over these dials and is for this purpose provided with an eye or slot 2 and a hair-cross 3. Such scales are shown in Figs. 4, 5 and 6.

The apparatus which is capable of developing the strains in the pieces on trial consists of a traction screw $n$ which carries the second holding jaw $f$ and traverses two sliding blocks $o$ and $g$ rigid with the latter. These two sliding blocks can either be set together or be arranged separately on the table of the dynamometer. The guide-block $o$ carries two systems of control of the screw $n$, one consists of a set of two pinions $o'$ $o^2$ at right angles for the rapid travel of the screw, the other consists of a system of tangential screws $o^3$ $o^4$ engaging with a pinion $o^5$ mounted on the guide block $o$. Both of the two guide or slide blocks of the screw $n$ can have a to and fro or reciprocating movement imparted to them by means of a connecting rod $q$, one part of which is attached to the front of the guide-block $o$, and the other part to a stud or pin fixed on an eccentric $d$. By varying the position of the stud or pin on the eccentric, the travel of the two guide-blocks can also be varied. The eccentric $d$ is carried by an axis fixed in a support $u$ which can be raised or lowered along a vertical slide way preferably cast with the table of the frame of the dynamometer. This support is provided on its lower part with a tangential or endless screw or worm $s$ which, being controlled at variable speeds by a three-step cone, engages with a pinion $r$ keyed upon the same axis as the eccentric wheel. Any kind of motor can impart motion to the whole by means of a belt. This arrangement of eccentric wheel permits of an alternate movement being communicated to the pieces being tested.

The Fig. 1 represents a piece held between the two jaws and which can be drawn either by slow traction or by alternate traction between two known weights and fixed at the will of the operator.

The tests of the durability of the pieces can be carried out in the following manner:—

The piece to be tested is stretched between the two retaining jaws, the eccentric is made to ascend so that its circumference which has a triturating tire, ring or rim, comes in contact with the under part of the piece being tested and wears it away or frictionally engages therewith. A small piece of metal or other substance pressed or urged by a rod 1 Fig. 3, which is in its turn pressed on this piece by means of a lever $y$ of the first order on which a sliding poise or weight $z$ moves, rests on the piece to be worn, with consequently a known pressure. The fixed point of support or fulcrum of the pressure lever is located in a small column or bracket $x$ securely bolted to the table or the frame of the dynamometer. The pressure is therefore known which applies the piece undergoing the friction to the tire or ring which wears it away, the tension which is supported initially by this piece is also known. When the triturating wheel is set in motion, this tension is increased or diminished according to the direction of rotation of the wheel. There is therefore ascertained by means of the variation in tension, the influencing effort which, relatively to the pressure undergone by the piece, immediately gives the coefficient of friction of the latter. The variation in weight undergone by this piece, after a known number of rotations of the wheel permits of determining the wear or durability of the piece. The same arrangement of a rod pressed or urged by the lever and furnished at its extremity with a point more or less sharp, permits of boring or perforating holes in a sample stretched with a known strain and either resting on the eccentric wheel or not. The pressures for punching or perforating tissues or fabrics, caoutchouc, thin sheets of metal or the like, can also be determined. The shearing of pieces by means of very sharp blades can also be effected.

The Figs. 6 and 7 show more in detail and less diagrammatically the device for measuring the wear of objects. The pieces shown in Fig. 3 are here reproduced under the same letters of reference $i$, $x$, $y$ and $z$. The pieces $i$, $x$ and $y$ are besides also visible in Fig. 1. The sliding weight $z$ slides upon a suitably graduated lever $y$ and 7 is a counter weight serving to maintain the equilibrium of the lever. 8 is the wheel bearing against the fabric to be tested and 9 the piece to be tested fastened between the jaws $e$ and $f$. It will be easily understood that if the rod $i$ serving to press the object to be tested against the testing wheel is replaced by a rod that is at its base more or less rounded, this rod being also pressed by lever $y$, that a known pressure is exerted upon a sample to be tested which may or may not be supported upon the wheel 8 which then remains immovable. The tests of flexion or bending of tissues or fabrics must be made in a different way, such tissues have often to undergo effects of flexion or bending in opposite directions and sometimes in rapid succession as in the case of pneumatic tires. In order to carry our repeated flexions of tissues and soft bodies, the dynamometer is used in the following manner, and in Fig. 8 the frame of the dynamometer shows in transverse section the device employed thereto: A small connecting rod 11 is employed which is controlled by the eccentric wheel and causes the ascent and descent of a vertical sliding-block 12 which moves in a special column located in the place of the column intended for the perforation and trituration, as mentioned above. This sliding block is provided at its extremity with a fork with two parallel rollers 13 and 14, between which is passed the tissue or soft body to be tested. On the other hand, the two extremities of the band of this tissue or soft body are retained in the traction jaws of the dynamometer, as is the case with stretcher bands. A tension can thus be exerted on the band which is known and variable at will, and bends it on all sides of the axis of traction in a known quantity by making the eccentric operate. On liberating the jaws $e$ and $f$ from their support by the pin $c$ these jaws are rendered capable of moving around their pivoted axis, and in this manner the breaking of the bent piece close to these jaws is avoided. It is possible therefore to work up to the point of rupture or breakage of the piece tested and to note all the characteristics concerning it which may be of interest. The dynamometer can also be used for the traction of metal wire or small hempen cords, the wire or cord is wound on pulleys which are mounted in the retaining jaws. The automatic registration of the diagram of tests is provided for the tests of traction, compression or flexion.

Figs. 9 and 10 illustrate the apparatus of registration. 15 is the drum upon a horizontal axis bearing the sheet of paper and which receives its movement by the displacement of a wire 16 following the deformation of the pieces to be tested and the turning motion of the drum is equal and proportional to this deformation. On the other hand in accordance with the spiral lines of the cylinder a rod 17 guided over rollers 18 is displaced which is actuated by a lever 19 forming one piece with the measuring spring and which is displaced in the same proportion as the deformation of the spring justifies, that is to say as the test piece is deformed. This rod bears a tracer 20 which traces the diagram upon the paper which indicates the deformations which have taken place in the objects submitted to the tests. Referring to Fig. 10, the lower plug $19^a$ to which the pulley $19^b$ and the lever 19 are attached is adapted to be engaged by the member shown in Figs. 1 and 2 at the point of attachment of said member to clamp the clamp $e$. The upper plug $21^a$ shown in Fig. 10, to which the wire 16 is attached, is adapted to be engaged by the said member at the point of attachment thereof to clamp the clamp $f$. This diagram shows the efforts, stresses or strains borne by the tested pieces according to the deformations undergone by the latter owing to these strains or the like. The strains or efforts are inscribed on the drum along generating contact lines. To that end, deformations given by the measuring springs are used, these deformations are amplified by means of a lever which carries along with it a tracing point which describes its track along the generating or contact lines of the drum, this tracing-point moving in a straight line parallel to the generating or contact lines of the drum.

Having thus described my invention, what I claim is:

1. An apparatus for measuring or testing, comprising a spiral spring of known resistance, having one end supported by the frame of the apparatus, a finger, means for guiding said finger, means capable of pressing said finger against the other end of said spring, a rod provided with a jaw for retaining the pieces to be tested, a toothed rack adapted to be engaged by said finger, and a pinion in gear with the rack and operating a needle, which is displaced on a dial with divisions, substantially as described.

2. An apparatus for developing strains or the like in the pieces to be tested, comprising in combination a traction screw, a retaining jaw controlled by said screw, sliding blocks supporting said screw in bearings, a connecting rod which imparts a to and fro or reciprocating movement to the sliding blocks, an eccentric wheel controlling said connecting rod and placed on an axis movable in a slide formed with the frame of the apparatus, adapted to impart an alternate movement to the pieces on trial, and a worm wheel and worm to revolve the eccentric wheel, substantially as described.

3. An apparatus for tests of durability, consisting of clamps to grip the test piece, means to remove said clamps from each other under a known pressure, of an eccentric wheel, an eccentric pin in said wheel, a slide suitably guided, two rollers in said slide, engaging the piece, and a rod connecting the slide with the pin, substantially as described.

In testimony whereof I affix my signature.

ALFRED DÉSIRÉ CILLARD.

In the presence of—
MAURICE DINNER,
H. C. COXE.